United States Patent

De Buyl et al.

[11] Patent Number: 5,908,909
[45] Date of Patent: Jun. 1, 1999

[54] ORGANOSILOXANE COMPOSITIONS

[75] Inventors: Francois De Buyl; Patrick Leempoel, both of Brussel, Belgium

[73] Assignee: Dow Corning S. A., Seneffe, Belgium

[21] Appl. No.: 08/938,976

[22] Filed: Sep. 26, 1997

Related U.S. Application Data

[63] Continuation-in-part of application No. 08/657,505, Jun. 4, 1996, Pat. No. 5,733,996.

[51] Int. Cl.$^6$ ........................................ B32B 9/04
[52] U.S. Cl. ............................ 528/17; 525/474; 525/475
[58] Field of Search ............................ 528/17; 525/474, 525/475, 477

[56] References Cited

U.S. PATENT DOCUMENTS

| | | | |
|---|---|---|---|
| 4,387,177 | 6/1983 | Mine et al. | 524/425 |
| 4,525,565 | 6/1985 | Laisney et al. | 528/17 |
| 4,525,566 | 6/1985 | Homan et al. | 528/17 |
| 4,530,882 | 7/1985 | Homan et al. | 428/452 |
| 4,585,705 | 4/1986 | Broderick et al. | 428/447 |
| 4,681,908 | 7/1987 | Broderick et al. | 524/268 |
| 4,743,474 | 5/1988 | Homan | 427/387 |
| 4,871,827 | 10/1989 | Klosowski et al. | 528/17 |
| 4,888,404 | 12/1989 | Klosowski et al. | 528/15 |
| 5,286,766 | 2/1994 | Arai et al. | 523/213 |
| 5,733,996 | 3/1998 | De Buyl et al. | 528/17 |

FOREIGN PATENT DOCUMENTS 4210349  7/1993  Germany .

*Primary Examiner*—Melvyn I. Marquis
*Attorney, Agent, or Firm*—Roger H. Borrousch

[57] ABSTRACT

A composition curable in presence of atmospheric moisture to an elastomeric body, comprising (A) the product formed by mixing a polymeric material having at least two groups bonded to silicon which are hydroxyl or alkoxy group and an alkoxysilane curative and (B) a titanium compound according to the general formula $Ti(OR)_x(OR')_y(OR^*)_z$ where x is 0 to 0.4 inclusive, y is 0 to 3.9, z is 0.1 to 4, x+y+z=4, R* is 2,4-dimethyl-3-pentyl, R' represents a monovalent tertiary aliphatic hydrocarbon group, and JR represents a monovalent linear aliphatic hydrocarbon group having 1 to 6 carbon atoms. The compositions cure quickly and do not yellow.

18 Claims, No Drawings

ORGANOSILOXANE COMPOSITIONS

This application is a continuation-in-part of Ser. No. 08/657,505, filed Jun. 4, 1996, now U.S. Pat. No. 5,733,996.

This invention is concerned with moisture curable organosiloxane compositions which are curable to elastomers and also relates to the use of such compositions as sealing materials.

Organosiloxane compositions which cure to elastomeric solids are well known. Typically such compositions are obtained by mixing a polydiorganosiloxane having reactive terminal groups, generally silanol groups, with a silane cross-linking agent for the polydiorganosiloxane, for example an alkoxy silane, an acetoxy silane, an oxime silane or an amino silane. These materials are frequently curable upon exposure to atmospheric moisture at room temperature.

One important application of the above-described curable compositions is their use as sealants. In use as sealants, it is important that the composition is capable of curing in comparatively thick layers to provide an elastomeric body having a thickness greater than about 2 mm. It is frequently desirable that the composition cures quickly enough to provide a sound seal within several hours but not so quickly that the surface cannot be tooled to desired configuration shortly after application. Among specifically desirable attributes for such compositions are fast surface cure rate, good elasticity of the skin formed and lack of surface tackiness after curing for about 24 hours. Also, it has long been desired to have a clear, translucent or "water white" product which retains its translucency and lack of color during use.

In order to achieve the desired speed of cure of alkoxy silane cured silicone compositions it has become a practice to employ certain organic titanium compounds as catalyst for the condensation reaction. Some of these titanium compounds are apt to react with methoxysilane to form a white precipitate in compositions containing them and this gives a discolouration and restricts the ability of the composition to cure. Also, the titanium compounds most generally preferred for this purpose are those derived from primary or secondary alcohols, for example, isopropylalcohol, n-butylalcohol. However, the titanium compounds employed in practice are often inadequate to promote a sufficiently rapid and/or deep cure and it is a practice to employ a chelating agent for example an acetyl acetonate as accelerator and stabilizer for the titanium compound. The acetyl acetonate may be mixed with the titanium compound or reacted with it to provide a complex. These materials containing acetonate inevitably lead to a cured silicone product which has a yellow tint. A solution to the problem of yellowing has been sought for many years but prior to the present invention it has not been known how to achieve the characteristics of desired speed of cure together with non yellowing with the alkoxy silane cured materials.

We have now found, surprisingly, that if one employs a member selected from a certain restricted class of compounds of titanium, one may provide alkoxysilane-cure silicone compositions curable at room temperature in presence of atmospheric moisture at a desired rate and to a desired thickness without the presence of acetylacetonate accelerator/stabilizer and provide translucent, "water white" cured products.

The present invention provides in one of its aspects a moisture curable composition capable of cure to an elastomeric body comprising (A) the product formed by mixing a polymeric material having at least two groups bonded to silicon which are hydroxyl or alkoxy groups, an alkoxysilane curative and (B) a compound according to the general formula $Ti(OR)_x(OR')_y(OR^*)_z$ where x has an average value from 0 to 0.4 inclusive, y has an average value from 0 to 3.9 inclusive, z has an average value from 0.1 to 4 inclusive, $x+y+z=4$, $R^*$ represents 2,4-dimethyl-3-pentyl, R' represents a monovalent tertiary aliphatic hydrocarbon group, and R represents a monovalent linear aliphatic hydrocarbon group having 1 to 6 carbon atoms.

Also included within the scope of this invention are the cured elastomeric products of the said compositions and the use of such compositions for sealing joints, cavities and the like.

In a composition according to the invention, the polymeric material is according to the general formula X-A-X where A may be any desired organic or siloxane molecular chain, for example, a polyoxyalkylene chain or more preferably a polydiorganosiloxane chain and thus preferably includes siloxane units $R''_s SiO_{4-s/2}$ in which R'' represents an alkyl group having from 1 to 6 carbon atoms, for example, a methyl group, a vinyl group or a phenyl group, or fluorinated alkyl group and s has a value of 0, 1 or 2. Preferred materials are linear materials i.e. s=2 for all units. Preferred materials have polydiorganosiloxane chains according to the general formula $—(R''_2 SiO)_t—$ in which each R'' represents a methyl group and t has a value from about 200 to about 1500. Suitable materials have viscosities of the order of about 500 mpa.s to about 200,000 mPa.s. The X groups of the polymeric material are hydroxyl or alkoxy groups and may be selected, for example, from $—R''_2 SiOH$, $—R'' Si(OR^5)_2$, $—Si(OR^5)_3$, $—R''_2 SiOR^5$ or $—R''_2 SiR'''SiR''_p(OR^5)_{3-p}$ where R'' is as aforesaid, (and is preferably methyl), R''' is a divalent hydrocarbon group which may be interrupted by one or more siloxane spacers having up to six silicon atoms, $R^5$ is an alkyl or alkyloxyalkyl group in which the alkyl groups have up to 6 carbon atoms and p has the value 0, 1 or 2.

In a composition according to the invention the alkoxysilane curative is of the general formula $R''_{4-n} Si(OR^5)_n$ wherein R'' and $R^5$ are as aforesaid and n has a value of 2, 3 or 4. Preferred silanes are those wherein R'' represents methyl, ethyl or vinyl, $R^5$ represents methyl or ethyl and n is 3. Examples of operative silanes are methyltrimethoxysilane (MTM), vinyltrimethoxysilane, methyltriethoxysilane, and vinyltriethoxysilane. A sufficient amount of this silane is employed to ensure adequate stability of the composition during storage and adequate crosslinking of the composition when exposed to atmospheric moisture.

The titanium compound according to the general formula $Ti(OR)_x(OR')_y(OR^*)_z$ preferably is not present as a precipitate in the composition. It appears important that the $R^*$ and R' groups have a bulky structure i.e. tertiary or 2,4-dimethyl-3-pentyl (a branched-secondary alkyl) in order to minimize the tendency of titanium atoms to oligomerize via an oxo bridge formation in between titanium atoms. A 4-coordinated titanium compound can thus be maintained as a stable species towards hydrolysis/condensation reaction under mild hydrolysis conditions. We thus avoid the use of acetylacetonate ligand to stabilize the titanium ester catalyst, and thus avoid the yellowing discoloration, whilst enhancing the speed of cure performance. Preferably there are several such $R^*$ and R' groups. Thus, in the titanium compounds selected, the proportion of the $R^*$ and R' groups are such that any tendency of the ligand groups attached to the titanium atom to associate with those of neighbouring molecules is reduced as compared with that achieved when the more usual titanate catalysts are employed. In titanium compounds having both R* groups as well as R' groups, the R' is preferably —C(R²R³R⁴) in which each of R², R³ and R⁴ represents a monovalent aliphatic chain having 1 to 6 carbon atoms. The most preferred titanium compounds are those in which x=0. Thus, preferred titanium compounds are according to the general formula

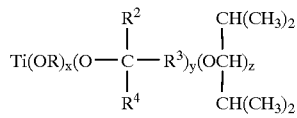

The titanium compounds of the above formula in which R' groups are present, preferably are those in which two or more of R², R³, and R⁴ represent methyl groups and any remaining one being an ethyl group, i.e. those in which R' represents —C(CH₃)₃ or —C(C₂H₅)(CH₃)₂. The titanium compound may be employed in conventional catalytic amounts, i.e. from about 0.2 to 10 parts by weight per 100 parts by weight of the polymeric material. These titanium compounds are highly branched alkoxy titanates and can be prepared prior to compounding into the curable composition. Some of the titanium compounds may also be prepared in situ in the composition. Preparation of the titanates prior to incorporation into the composition may be carried out by reacting tetra-chloro-titanium (TiCl₄) or tetra-isopropoxy titanium (TiPT) with 2,4-dimethylpentan-3-ol or a mixture of 2,4-dimethylpentan-3-ol and one or more tertiary alkyl alcohols. Preferred tertiary alcohols are tertio-butanol (R' is —C(CH₃)₃) (referred to herein as ′BuOH) and tertio-amyl alcohol (R' is —C(C₂H₅)(CH₃)₂) (referred to herein as ′AmOH). The reaction by-product, e.g. HCl or isopropyl alcohol, is preferably removed from the reaction medium to obtain the desired titanate. In the alkoxy exchange method, the starting material is preferably selected to ensure easy removal of the displaced alcohol by vacuum devolatilization. Thus the displaced alcohol should have a lower boiling point than the alcohol with which it is replaced. Accordingly, not all alkoxy titanates are suitable for use with 2,4-dimethylpentan-3-ol and the preferred tertiary alcohols as will be apparent from inspection of the boiling points of the alcohols which may be considered. For example, the boiling points of isopropanol, tertio-butanol, tertio-amyl alcohol and n-butanol are 82° C., 83° C., 102° C. and 118° C. respectively. Reaction of tert-amyl alcohol is expected to be favorable with tetra isopropyl titanate (TiPT), tetra ethyl titanate (TEtT) or tetra methyl titanate (TMeT), whereas the reaction of tert-butyl alcohol is only favourable with TMeT. We have found that the ester interchange reaction has to be performed to an extent such that the purity of the titanium compound is equal to or superior to 90 mole % of the groups on the titanium atoms of the titanium compound product are 2,4-dimethyl-3-pentoxy, tertiary butoxy, and tertiary amyloxy, in order to provide a titanium compound suitable for use as a catalyst in a composition according to this invention, to achieve the fast cure rate and tack free performance of layers of the composition of more than 2 mm thickness on a reasonable time scale, such as less than one hour. Thus, we prefer that the values of x, y, and z in the formula Ti(OR)$_x$(OR')$_y$(OR*)$_z$ are in the ranges for x to be <0.4, for y to be <3.9, and for z to be >0.1. The most preferred titanium compounds are those in which x is 0 and f+z is 4.

As mentioned above, it is possible to prepare certain of the preferred catalysts by an in-situ technique. This may be done by adding to a composition certain appropriately selected conventional tetra-alkoxy-titanates where the alkyl of the alkoxy group is linear and for example the alkoxy groups can be isopropoxy (also named propan-2-ol) and n-butoxy, during the compounding of the composition, a tertiary alcohol is selected in accordance with the boiling point criteria mentioned above. Preferably, in this aspect, a conventional tetra-alkoxy-titanate can be tetra-isopropyl-titanate and a highly branched alcohol can be 2,4-dimethylpentan-3-ol or a mixture of 2,4-dimethylpentan-3-ol and a tertiary alcohol such as tertiary amyl alcohol and tertiary butyl alcohol. When tertiary butyl alcohol is used, higher temperature for processing and stripping (>60° C.) are used.

In order to provide a composition exhibiting a spectrum of properties in terms of rheology, cure, mechanical properties, adhesion and appearance, we prefer to employ not less than 4 molar equivalents of highly branched alcohol per mole of the conventional titanate employed.

Compositions according to the present invention containing the titanium catalyst compounds but no co-catalyst and no chelating agent cure at an acceptably fast rate, such that skin-over-times are less than 30 minutes, and give well cured translucent or water white elastomeric reaction products in thicknesses greater than 2 mm. If a more rapid cure is desired, a chelate, for example an acetylacetonate, may be added to the mixture. Materials conventionally used as accelerator/stabilizers for titanium catalysts may be employed, for example ethylacetoacetate and methylacetoacetate, but these also lead to yellowing of the product.

Compositions of this invention may contain as optional constituents other ingredients which are conventional to the formulation of silicone rubber sealants and the like. For example, the compositions will normally contain one or more finely divided, reinforcing or extending fillers such as high surface area fume and precipitated silicas, crushed quartz, diatomaceous earths, calcium carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the compositions are co-catalysts for increasing the rate of cure of the composition, pigments, plasticisers, agents (usually organosilicon compounds) for treating fillers, rheological additives for improving toolability of the composition and adhesion improving substances for example γ-aminopropyltriethoxysilane. Suitable co-catalysts are well known in the art and include the metal salts of carboxylic acids, for example lead octoate and dibutyltin dilaurate, dibutyltin diacetate and stannous octoate. Another conventional ingredient which can be employed as a plasticiser and to reduce the modulus of the cured elastomer is a polydimethylsiloxane having terminal triorganosiloxy groups wherein the organic substituents are e.g. methyl, vinyl or phenyl or combinations of these groups. Such polydimethylsiloxanes normally have a viscosity of from about 100 to about 100,000 mPa.s at 25° C. and can be employed in amounts up to about 80 parts per 100 parts by weight of the polymeric material.

The compositions of this invention can be prepared by mixing the ingredients in any order and employing any suitable mixing equipment, preferably under moisture free conditions. It is generally preferred to add the titanium compound after mixing together the polymeric material and the curative silane and to add the highly branched alcohol thereafter if an in-situ preparation of the titanium compound catalyst of the invention is to be achieved. Any optional additional ingredients may be incorporated at any stage of the mixing operation but are preferably added after the catalyst. After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures. They have desired cure properties to provide cured seals of modulus sufficiently low for most industry standards and elongation to break which is sufficiently high for most industry standards.

In order that the invention may become more clear there now follows a description of titanium compound preparations and sealant compositions prepared from those titanium compounds to illustrate the invention by way of example and comparative example. In the description all parts are expressed by weight and all viscosities are at 25° C.

PREPARATION OF TITANATE COMPOUNDS (1) 98 g of 2,4-dimethylpentan-3-ol(b.p. 140° C.) was mixed with 40.4 g of tetraisopropyltitanate. The mixture was heated at 80° C. for 30 minutes under constant vacuum to react the ingredients and remove isopropanol, then excess alcohol was distilled from the reaction mixture. The distillation was stopped when no more volatiles seemed to come out. The resulting titanate had 44% of the isopropoxy groups replaced by 2,4-dimethyl-3-pentoxy groups. To the resulting titanate product, 97 g was added and the resulting mixture was heated to 80° C. for 30 minutes under constant vacuum to remove isopropanol. The excess alcohol was removed by distillation and the resulting titanate had 90% of the isopropoxy groups replaced by 2,4-dimethyl-3-pentoxy groups where the average formula of the titanium was

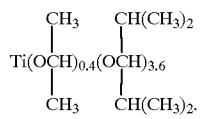

(2) Repeating the procedure of (1), but using two times successively 100 g of 2,6-dimethylheptan-4-ol (b.p. 178° C.) and 32 g of tetraisopropyl titanate, the resulting titanium compound was a (2,6-dimethyl-4-heptyl)titanate having oligomers such that there was an average of between 6 and 8 2,6-dimethyl-4-heploxy groups per molecule.

(3) Repeating the procedure of (1), but using two, times successively 150 g of 3-methylbutan-2-ol (b.p. 112° C.) and 80.3 g of tetraisopropyl titanate, the resulting titanium compound was tetra(3-methyl-2-butyl)titanate of the formula

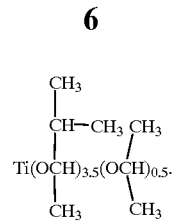

(4) Repeating the procedure of (1), but using two times successively 152 g of pentan-3-ol (b.p. 115° C. at 749mmHg) and 81.3 g of tetraisopropyl titanate, the resulting titanium compound was a (3-pentyl)titanate of the formula

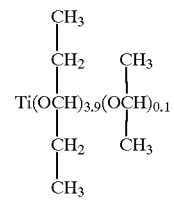

(5) Repeating the procedure of (1), but using two times successively 153 g of pentan-1-ol (b.p. 137° C.) and 82.2 g of tetraisopropyl titanate, the resulting titanium compound was a (1-pentyl)titanate having oligomers such that there was an average of between 5 and 6 1-pentoxy groups per molecule.

(6) Repeating the procedure of (1), but using two times successively 154 g of 3-methylbutan-1-ol and 80.7 g of tetraisopropyl titanate, the resulting titanium compound was tetra(3-methyl-1-butyl)titanate of the formula

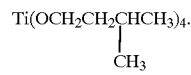

(7) Repeating the procedure of (1), but using two times successively 150 g of tertiary amyl alcohol and 80.3 g of tetraisopropyl titanate, the resulting titanium compound was tetra(tertiary amyl) titanate of the formula

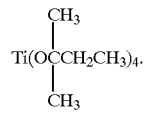

(8) Repeating the procedure of (1), but using two times successively 150 g of neopentanol and 81.2 g of tetraisopropyl titanate, the resulting titanium compound was a (neopentoxy) titanate having oligomers such that there was an average of 5.7 neopentoxy groups per molecule.

Example

A sealant composition was prepared by mixing at room temperature in absence of moisture 70 parts of polymeric material (Polymer A), 4.9 parts of methyl trimethoxysilane (MTM), parts of titanium compound as prepared above and shown in Table 1, 8 parts of silica, 0.25 part of rheological additive (3), 13 parts of trimethylsilyl end-blocked polydimethylsiloxane fluid of viscosity 100 mPa.s, and 1.2 parts of an adhesion promoter. The polymeric material was a polydimethylsiloxane of the formula $(R^5O)_3Si$—$R'''$—$SiR''_2O$—$(R''_2SiO)_t$—$SiR''_2$—$R'''$—$Si(OR^5)_3$ in which $R^5$ represents ethyl, $R'''$ represents $C_2H_4$, $R''$ represents methyl and t has a value such that the polymer has a viscosity of about 110,000 mPa.s.

TABLE I

| SEALANT FORMULATION NO. | TITANIUM COMPOUND | PARTS TITANIUM COMPOUND |
|---|---|---|
| a.* | TtBT** | 2.5 |
| b.* | (7) | 2.95 |
| c.* | (5) | 2.95 |
| d.* | (6) | 2.95 |
| e.* | (8) | 2.95 |
| f.* | (4) | 2.95 |
| g.* | (3) | 2.95 |
| h.* | (2) | 4.57 |
| i. | (1) | 3.75 |

*Comparative example
**tetra(tertiary butyl) titanate

Each of the compositions was extruded as a bead into a 310 ml cartridge from the mixer and stored therein for 7 days. Composition from each cartridge was used to provide cured samples from which various physical properties were determined according to standard test methods. Skin over time (SOT) was determined as the period of time during which the surface of an applied bead of the composition could be tooled or worked. Skin-Over-Time was measured by spreading the material to form a layer 0.32+/−0.08 cm thick on a clean smooth non porous surface. The sample was exposed the relative humidity of 50% RH at 25° C. At one minute intervals, the surface was lightly touched with a finger tip and the finger slowly drawn away. This was repeated every minute until the sample did not adhere to the finger tip. The time in minutes elapsed from spreading the material until the surface did not adhere to the finger tip was recorded as Skin-Over-Time. Surface tackiness was determined as the period of time elapsed after extrusion of a bead of the composition until the surface was no longer tacky to the touch. Tack-Free-Time (TFT) was measured by spreading the material 2 mm thick on a clean smooth non porous surface. The sample was exposed to 50% RH at 22° C. At intervals of 5 minutes or less a clean polyethylene strip was laid on a fresh surface of the sample and gently pulled off. The time in minutes elapsed between spreading the sample and when the strip pulled away cleanly from the surface was recorded as the Tack-Free-Time. Skin elasticity was determined by extruding a bead of composition onto a substrate—exposing it to ambient conditions i.e. typically 50% RH and 25° C. After a given period of time, typically 2 hours during which the bead has been allowed to cure, skin elasticity was evaluated by pulling in/pulling out with the fingers the skin that has been formed during these first two hours of cure. The resistance of the skin to cracking and its "elastic recovery" was evaluated and rated.

Rating:

0=poor and means that the skin that has been formed was so thin that it cracked at the first pulling-out/pulling-in action;

1=medium and means that some skin was formed, solid enough to resist to some early pulling-out/pulling-in movements;

2=good and 3=excellent and means that a very elastic skin was formed during the first two hours of cure under the ambient conditions of cure, and that one may repeat the pulling-out/pulling-in action several times without observing cracking of the skin. Elastic recovery of the skin was also very good in that case.

Cure in depth (CID) was determined as the thickness in mm of the composition which was found to have cured to an elastomeric state during ageing at ambient temperature and humidity for a specified period, 24 hours and 72 hours. Color of the cured material was determined for each formulation and all were clear and water white. The results were as shown in Table 2.

TABLE 2

| | SEALANT FORMULATION | | | | | | | | |
|---|---|---|---|---|---|---|---|---|---|
| PROPERTY | a. | b. | c. | d. | e. | f. | g. | h. | i. |
| SOT(min) | 9 | 8 | >60 | >60 | 60 | 69 | 55 | 116 | 25 |
| TFT(min) | 55 | 14 | 450 | 409 | 70 | 80 | 65 | 353 | 43 |
| CID 24 Hr , mm | 2.25 | 2.15 | 2.27 | 2.48 | 2.59 | 2.87 | 2.81 | 2.86 | 2.12 |
| CID 72 Hr., mm | 3.75 | 3.49 | 3.72 | 3.73 | 4.52 | 4.76 | 4.82 | 4.75 | 3.49 |
| Extrusion rate, g/min | 153 | 161 | 177 | 182 | 145 | 150 | 161 | 195 | 204 |
| Skin Elasticity | 2 | 3 | 0 | 0 | 1 | 1 | 0 | 0 | 2 |
| Tensile strength at break, Mpa | 2.32 | 2.05 | 1.38 | 1.79 | 1.54 | 1.77 | 1.96 | 1.5 | 1.81 |
| Elongation at break, % | 530 | 451 | 384 | 442 | 430 | 400 | 464 | 410 | 357 |
| Hardness, Shore A scale | 24 | 25 | 22 | 19 | 23 | 21 | 22 | 20 | 21 |

From these results it can be seen that the illustrative sealant formulations which employ the selected titanium compounds having 2,4-dlimethyl-3-pentoxy groups or tertiary alkoxy groups cure rapidly and exhibit good to excellent skin elasticity.

Comparison Example

A masterbatch sealant composition was prepared by mixing at room temperature in absence of moisture 70 parts of polymeric material, 4 parts of methyltrimethoxysilane, 6.6 parts of silica, 1 part of rheological additive and 13 parts of trimethylsilyl end-blocked polydimethylsiloxane fluid having a viscosity of 100 mPa.s. The polymeric material was a polydimethylsiloxane of the formula $(R^5O)_3Si$—$CH_2CH_2$—$SiR"_2O(R"_2SiO)_tSiR"_2$—$CH_2CH_2$—$Si(OR)_3$ where $R^5$ represents ethyl, R" represents methyl, and t had a value of about 1300 and a viscosity of 60,000 mPa.s.

A first composition (1) was made by mixing 94.6 parts of the masterbatch, 1 part of methyltrimethylsilane, 1.5 parts of tetra(n-butyl) titanate (TnBT), and 0.25 part of adhesion promoter (a mixture of gamma-glycidoxypropyltrimethoxysilane and beta-amino-ethyl-gamma-aminopropyltrimethoxysilane.

A second composition (2) was prepared by mixing 94.6 parts of the masterbatch, 1 part of methyltrimethoxysilane, 1.5 parts of tetra(tertiary butyl)titanate (TtBT), and 0.25 part of the adhesion promoter as defined for the first composition.

A third composition (3) was prepared by mixing 9P4.6 parts of the masterbatch, 1 part of methyltrimethoxysilane, 1.5 parts of tetra(isopropyl)titanate (TiPT), and 0.25 part of the adhesion promoter as defined for the first composition.

A fourth composition (4) was prepared by mixing 94.6 parts of the masterbatch, 1 part of methyltrimethoxysilane, 1.5 parts of tetra(tertiary amyl)titanate (TtAT), and 0.25 part of the adhesion promoter as defined for the first composition.

The SOT, TFT, and skin elasticity were measure in accordance with the test procedures described for the previous example. The results were as shown in Table 3.

TABLE 3

| COMPOSITION | TITANIUM COMPOUND | SOT, min | TFT, min | Skin Elasticity |
|---|---|---|---|---|
| (1) | TnBT | >4 hours | >>> | 0 |
| (2) | TtBT | 9 | 41 | 2 |
| (3) | TiPT | 35 | >60 | 0 |
| (4) | TtAT | 20 | 50 | 2 |

That which is claimed is:

1. A moisture curable composition capable of cure to an elastomeric body, comprising (A) the product formed by mixing a polymeric material having at least two groups bonded to silicon which are hydroxyl or alkoxy groups and an alkoxysilane curative and (B) a compound according to the general formula $Ti(OR)_x(OR')_y(OR^*)_z$ where x has an average value from 0 to 0.4 inclusive, y has an average value from 0 to 3.9 inclusive, z has an average value of from 0.1 to 4 inclusive, $x+y+z=4$, E represents a monovalent tertiary aliphatic hydrocarbon group, R represents a monovalent linear aliphatic hydrocarbon group having 1 to 6 carbon atoms, and R* represents 2,4-dimethyl-3-pentyl.

2. A moisture curable composition according to claim 1 in which z is greater than 3.5.

3. A moisture curable composition according to claim 1 wherein R' represents $—C(R^2R^3R^4)$ in which each of $R^2$, $R^3$ and $R^4$ represents a monovalent aliphatic chain having 1 to 6 carbon atoms.

4. A moisture curable composition according to claim 2 wherein R' represents $—C(R^2R^3R^4)$ in which each of $R^2$, $R^3$ and $R^4$ represents a monovalent aliphatic chain having 1 to 6 carbon atoms.

5. A moisture curable composition according to claim 2 wherein y is 0, and R is isopropyl.

6. A moisture curable composition according to claim 3 wherein each R' is selected from the group consisting of tertiary-butyl and tertiary-amyl.

7. A composition according to claim 1 wherein the polymeric material is an at least substantially linear polydiorganosiloxane having terminal groups selected from the groups $—SiMCe_2OH$ and $—SiMe_2R'''Si(OR)_3$ where Me is methyl.

8. A moisture curable composition according to claim 7 in which z is greater than 3.5.

9. A composition according to claim 1 wherein the alkoxysilane is methyl trimethoxysilane.

10. A moisture curable composition according to claim 9 in which z is greater than 3.5.

11. A moisture curable composition according to claim 1 further comprising finely divided filler.

12. A moisture curable composition according to claim 11 wherein the finely divided filler is predominantly silica.

13. A method of forming an elastomeric mass between surfaces which is adherent to at least two such surfaces which method comprises introducing between the surfaces a mass of a moisture curable composition comprising (A) the product formed by mixing a polymeric material having at least two groups bonded to silicon which are hydroxyl or alkoxy groups, and an alkoxysilane curative, and (B) a titanium compound for catalyzing the condensation reaction between the polymeric material and the alkoxy silane which comprises a compound according to the general formula $Ti(OR)_x(OR')_y(OR^*)_z$ where x has an average value from 0 to 0.4 inclusive, y has an average value from 0 to 3.9 inclusive,, z has an average value of from 0.1 to 4, $x+y+z=4$, R* represents 2,4-dimethyl-3-pentyl, R' represents a monovalent tertiary aliphatic hydrocarbon group, and R represents a monovalent linear aliphatic hydrocarbon group having 1 to 6 carbon atoms.

14. A method according to claim 13 wherein the titanium compound of (B) is formed by chemical reaction between a tetra alkoxy titanium compound in which the alkyl of the alkoxy is linear and 2,4-dimethylpentan-.3-ol or a mixture of 2,4-dimethylpentan-3-ol and a tertiary aliphatic alcohol.

15. A method according to claim 13 wherein the chemical reaction to produce the titanium compound of (B) is brought about in the preparation of the product (A).

16. A moisture curable composition according to claim 1 wherein the titanium compound of (B) is formed by chemical reaction between a tetra alkoxy titanium compound in which the alkyl of the alkoxy group is linear and 2,4-dimethylpentan-3-ol or a mixture of 2,4-dimethylpentan-3-ol and a tertiary aliphatic alcohol.

17. A moisture curable composition according to claim 16 wherein the chemical reaction to produce the titanium compound of (B) is brought about in the preparation of the product (A).

18. A cured product obtained by exposure of the moisture curable composition of claim 1 to atmospheric moisture.

* * * * *